(12) United States Patent
Qiu et al.

(10) Patent No.: US 12,417,654 B2
(45) Date of Patent: Sep. 16, 2025

(54) METHOD FOR CAPTURING THREE DIMENSIONAL ACTIONS OF MULTIPLE PERSONS, STORAGE MEDIUM AND ELECTRONIC DEVICE

(71) Applicant: UNILUMIN GROUP CO., LTD, Shenzhen (CN)

(72) Inventors: Youhai Qiu, Shenzhen (CN); Yi Tang, Shenzhen (CN); Qianru Xu, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 379 days.

(21) Appl. No.: 18/166,649

(22) Filed: Feb. 9, 2023

(65) Prior Publication Data

US 2023/0186684 A1    Jun. 15, 2023

Related U.S. Application Data

(63) Continuation of application No. PCT/CN2021/105486, filed on Jul. 9, 2021.

(30) Foreign Application Priority Data

Nov. 12, 2020   (CN) .......................... 202011260863.4

(51) Int. Cl.
*G06V 40/20* (2022.01)
*G06T 7/73* (2017.01)
(Continued)

(52) U.S. Cl.
CPC ............... *G06V 40/20* (2022.01); *G06T 7/73* (2017.01); *G06V 10/762* (2022.01);
(Continued)

(58) Field of Classification Search
None
See application file for complete search history.

(56) References Cited

U.S. PATENT DOCUMENTS

| | | | |
|---|---|---|---|
| 2010/0097262 A1 | 4/2010 | Hong et al. | |
| 2017/0323443 A1* | 11/2017 | Dhruwdas | G06T 11/006 |
| 2018/0276885 A1* | 9/2018 | Singh | G06T 7/579 |

FOREIGN PATENT DOCUMENTS

| | | |
|---|---|---|
| CN | 110020611 A | 7/2019 |
| CN | 110544301 A | 12/2019 |

(Continued)

OTHER PUBLICATIONS

International Search Report and Written Opinion issued in corresponding PCT Application No. PCT/CN2021/105486, dated Oct. 13, 2021.

(Continued)

*Primary Examiner* — Delomia L Gilliard
(74) *Attorney, Agent, or Firm* — Westbridge IP LLC (57) ABSTRACT

Disclosed are a method for capturing three dimensional actions of multiple persons, a storage media and an electronic device. The method includes: obtaining synchronous video frames of multiple cameras, recognizing and positioning joint points in each synchronous video frame of each camera, to obtain two dimensional (2D) joint point of each person in each camera; calculating an anti-projection ray of each 2D joint point, and clustering coordinates of two endpoints of a shortest distance between two anti-projection rays to obtain a 2D personnel matching scheme, wherein the anti-projection ray is from a camera pointing to its corresponding 2D joint point; and performing a three dimensional (3D) reconstruction for each person according to the 2D personnel matching scheme, to generate 3D information of each person for capturing 3D actions.

9 Claims, 5 Drawing Sheets

(51) Int. Cl.
　　　*G06V 10/762*　　　(2022.01)
　　　*G06V 10/764*　　　(2022.01)
　　　*G06V 20/64*　　　(2022.01)

(52) U.S. Cl.
　　　CPC ............ *G06V 10/764* (2022.01); *G06V 20/64* (2022.01); *G06T 2207/10016* (2013.01); *G06T 2207/30196* (2013.01)

(56) References Cited

FOREIGN PATENT DOCUMENTS

| | | | | | |
|---|---|---|---|---|---|
| CN | 111028271 | A | * | 4/2020 | ............ G06T 7/292 |
| CN | 111797714 | A | * | 10/2020 | ......... G06K 9/00369 |
| CN | 112379773 | A | | 2/2021 | |
| JP | 2013137785 | A | | 7/2013 | |
| WO | 2009140261 | A1 | | 11/2009 | |
| WO | 2014003081 | A1 | | 1/2014 | |

OTHER PUBLICATIONS

First Office Action issued in counterpart Japanese Patent Application No. JP 2022-546634, dated Aug. 23, 2023.
First Office Action issued in counterpart Chinese Patent Application No. 202011260863.4, dated Jul. 11, 2023.
Second Office Action issued in counterpart Chinese Patent Application No. 202011260863.4, dated Sep. 15, 2023.

* cited by examiner

METHOD FOR CAPTURING THREE DIMENSIONAL ACTIONS OF MULTIPLE PERSONS, STORAGE MEDIUM AND ELECTRONIC DEVICE

CROSS-REFERENCE TO RELATED APPLICATIONS

This application is a continuation application of International Application No. PCT/CN2021/105486, filed on Jul. 9, 2021, which claims priority to Chinese Patent Application No. 202011260863.4, filed on Nov. 12, 2020. The disclosures of the above-mentioned applications are incorporated herein by reference in their entireties.

TECHNICAL FIELD

The present application relates to the technical field of human-computer interaction, especially relates to a method for capturing three dimensional actions of multiple persons, a storage media and an electronic device.

BACKGROUND

Since 2013, a virtual reality (VR) technology has gradually become popular worldwide. The action capture technology is a key technology in VR technology.

Currently, the traditional action capture system adopts the principle of optical, inertia, or mechanical work. The users need to use third-party hardware, wear specific action capture clothing and props to interact with the system, resulting in not direct interaction of human-computer.

With a development of deep learning, the computing power and the algorithm accuracy of the computer are effectively improved, especially in the field of image processing, the computer can estimate human's postures such as actions, facial expressions, finger movements, etc. in the image. The OpenPose (GitHub open source human posture identification project) human posture recognition project can estimate human's postures such as actions, facial expressions, finger movements, and support the action capture function of a single person. When a single person enters the scene, the OpenPose can reconstruct three dimensional (3D) joint points for two dimensional (2D) joint points. In the densely crowded scene, due to the coverage of the camera's perspective, the number of people recognized by the camera is different, the algorithm for selecting person is difficult to match the correct 2D joint points of the person, resulting in the error reconstruction of the 3D joint point of the person.

SUMMARY

One aspect of the present application provides a method for capturing three dimensional actions of multiple persons, including:
  obtaining synchronous video frames of multiple cameras, recognizing and positioning joint points in each synchronous video frame of each camera, to obtain two dimensional (2D) joint point of each person in each camera;
  calculating an anti-projection ray of each 2D joint point, and clustering coordinates of two endpoints of a shortest distance between two anti-projection rays to obtain a 2D personnel matching scheme, wherein the anti-projection ray is from a camera pointing to its corresponding 2D joint point; and
  performing a three dimensional (3D) reconstruction for each person according to the 2D personnel matching scheme, to generate 3D information of each person for capturing 3D actions.

Another aspect of the present application provides an electronic device, including a memory and a processor, a computer program runnable on the processor and stored on the memory, wherein the processor when executing the computer program implements the method for capturing three dimensional actions of multiple persons as mentioned above.

Another aspect of the present application provides a device for capturing three dimensional actions of multiple persons, including:
  a synchronous video frame obtaining module, configured to obtain synchronous video frames of multiple cameras, recognize and position joint points in each synchronous video frame of each camera, to obtain two dimensional (2D) joint point of each person in each camera;
  a clustering module, configured to calculate an anti-projection ray of each 2D joint point, and cluster coordinates of two endpoints of a shortest distance between two anti-projection rays to obtain a 2D personnel matching scheme, wherein the anti-projection ray is from a camera pointing to its corresponding 2D joint point; and
  a reconstruction module, configured to perform a three dimensional (3D) reconstruction for each person according to the 2D personnel matching scheme, to generate 3D information of each person for capturing 3D actions.

The details of each embodiment of the present application will be explained in the drawings and descriptions as below. Those skilled in the art will easily understand the other characteristics, the solved problem and the beneficial effects of the present application according to the instructions, drawings and claims.

BRIEF DESCRIPTION OF THE DRAWINGS

In order to better describe and explain the embodiments of the present application, one or more drawings can be referred, but the additional details or examples used to describe the drawings should not be considered as the limitation of scope of the invention creation or the currently described embodiments of the present application.

DETAILED DESCRIPTION OF THE EMBODIMENTS

In order to explain the technical content, the purpose and effect of the present application in detail, the following combines the embodiments with the drawings to describe.

Referring to FIGS. 1 to 5, the present application provides a method for capturing three dimensional actions of multiple persons, including:

obtaining synchronous video frames of multiple cameras, recognizing and positioning joint points in each synchronous video frame of each camera, to obtain two dimensional (2D) joint point of each person in each camera;

calculating an anti-projection ray of each 2D joint point, and clustering coordinates of two endpoints of a shortest distance between two anti-projection rays to obtain a 2D personnel matching scheme, wherein the anti-projection ray is from a camera pointing to its corresponding 2D joint point; and performing a three dimensional (3D) reconstruction for each person according to the 2D personnel matching scheme, to generate 3D information of each person for capturing 3D actions.

It can be seen from the above description that multiple cameras are used to collect and identify different perspectives in the scene, and calculate and cluster the short distance between two anti-projection rays according to the principle that two anti-projection rays of the same joint point from different cameras should overlap, to correctly match multiple joint points of different cameras, to solve a problem that the 2D joint points are matched wrongly due to the obstruction existing in dense scenes and mis-recognition of 2D joint points, thus the actions of multiple persons are captured.

In an embodiment, the calculating an anti-projection ray of each 2D joint point, and clustering coordinates of two endpoints of the shortest distance between two anti-projection rays to obtain the 2D personnel matching scheme includes:

classifying all 2D joint points according to joint point types to obtain all 2D joint points corresponding to each joint point type;

calculating the anti-projection ray of each 2D joint point of each joint point type, clustering coordinates of two endpoints of according to the shortest distance between two anti-projection rays, to obtain a joint point matching scheme of each joint point type; and merging joint point matching schemes of all joint point types to obtain the 2D personnel matching scheme.

It can be seen from the above description that when the joint points are positioned, multiple joint points are classified according to joint point types, and only the joint points of the same joint point type are matched and calculated, to reduce the number of matching operations, and increase the processing speed.

In an embodiment, the calculating anti-projection ray of each 2D joint point includes:

for each 2D joint point, obtaining a 3D coordinate of the camera according to an origin of coordinates and corresponding extrinsic parameters, and taking the 3D coordinate of the camera as an endpoint of the anti-projection ray; and obtaining a direction vector of the anti-projection ray according to the corresponding intrinsic parameters, extrinsic parameters and a coordinate of each 2D joint point, to obtain the anti-projection ray of each 2D joint point.

It can be seen from the above description that there is an origin of coordinates for the coordinate system to be established. The 3D coordinates of the camera and 3D coordinates corresponding to 2D joint points according to the relative relationship of the actual space, to obtain the anti-projection ray of each 2D joint point.

In an embodiment, the clustering coordinates of two endpoints of the shortest distance between two anti-projection rays to obtain the 2D personnel matching scheme includes:

calculating the shortest distance between the anti-projection ray of each 2D joint point in each camera and the anti-projection ray of each 2D joint point in each other cameras of a same joint point type, and obtaining the coordinates of two endpoints of the shortest distance between the anti-projection rays; and clustering all the endpoints of each joint point type to output a clustering result; and generating the joint point matching scheme of each joint point type according to the clustering result.

In an embodiment, the obtaining coordinates of two endpoints of the shortest distance between the anti-projection rays includes:

an anti-projection ray $\overline{line_s}$ having a starting point coordinate $s_0$ and a direction vector $\vec{d_s}$, an anti-projection ray $\overline{line_t}$ having a starting point coordinate $t_0$ and a direction vector $\vec{d_t}$, a vector of the anti-projection ray $\overline{line_s}$ is $line_s = s_0 + \vec{d_s}$;

a vector of the anti-projection ray $\overline{line_t}$ is $line_t = t_0 + \vec{d_t}$;

vectors of coordinates $s_j$, $t_j$ of the two endpoints of the shortest distance between the anti-projection ray $\overline{line_s}$ and the anti-projection ray $\overline{line_t}$ being $s_j = s_0 + s_c \cdot \vec{d_s}$, $t_j = t_0 + t_c \cdot \vec{d_t}$;

a vector of the shortest distance between the anti-projection ray $\overline{line_s}$ and the anti-projection ray $\overline{line_t}$ being a first formula $\vec{w} = \vec{w_0} + s_c \cdot \vec{d_s} - t_c \cdot \vec{d_t}$, wherein $s_c$ and $t_c$ are scalar;

substituting the first formula into $\vec{d_s} \cdot \vec{w} = 0$ and $\vec{d_t} \cdot \vec{w} = 0$, to obtain a second formula $(\vec{d_s} \cdot \vec{d_s})s_c - (\vec{d_s} \cdot \vec{d_t})t_c = -\vec{d_s} \cdot \vec{w_0}$ and a third formula $(\vec{d_s} \cdot \vec{d_t})s_c - (\vec{d_t} \cdot \vec{d_t})t_c = -\vec{d_t} \cdot \vec{w_0}$, to obtain the scalar $sc = (be - cd)/(ac - b^2)$ and the scalar $tc = (ae - bd)/(ac - b^2)$;

wherein $a = (\vec{d_s} \cdot \vec{d_s})$, $b = (\vec{d_s} \cdot \vec{d_t})$, $c = (\vec{d_t} \cdot \vec{d_t})$, $d = \vec{d_s} \cdot \vec{w_0}$, $e = \vec{d_t} \cdot \vec{w_0}$;

determining whether $ac - b^2$ is equal to 0;

in response that $ac - b^2$ is equal to 0, the anti-projection ray $\overline{line_s}$ being parallel to the anti-projection ray $\overline{line_s}$, and specifying a fixed point on one of the two anti-projection rays as one of the two endpoints to be substituted into the second formula and the third formula, to obtain coordinates $s_j$, $t_j$ of the two endpoints;

in response that $ac - b^2$ is not equal to 0, obtaining the coordinates $s_j$, $t_j$ of the two endpoints according to the scalar $s_c = (be - cd)/(ac - b^2)$ and the scalar $t_c = (ae - bd)/(ac - b^2)$.

In an embodiment, it can be seen from the above description that the anti-projection rays of the same joint point from different cameras should be overlapped, but the anti-projection rays of the same joint point from different cameras maybe not overlapped due to observation errors and 2D recognition errors, but they must be very close. Thus, the shortest distance between the anti-projection rays is obtained by a calculation method of the shortest distance between the two straight lines, to determine whether the joint points of different cameras are the same joint point.

In an embodiment, the clustering all the endpoints of each joint point type to output a clustering result, and generating the joint point matching scheme of each joint point type according to the clustering result includes:

obtaining the shortest distance $d_{min}=|s_j-t_j|$ according to the coordinates $s_j$, $t_j$ of the two endpoints, when the coordinates of the two endpoints of the shortest distance between any two of the anti-projection rays are obtained;

deleting shortest distances $d_{min}$ in each joint point type larger than a preset distance threshold, and forming an endpoint set R with endpoints corresponding to remaining shortest distances in each joint point type, wherein each endpoint corresponds to a 2D joint point, a camera identification and a person identification;

performing a neighboring matching on all the endpoints in the endpoint set R of each joint point type through a K's neighboring classification algorithm, to obtain a cluster formed by neighboring endpoints, and ranking the cluster from high to low according to the number of the endpoints in the cluster to obtain ranked cluster;

wherein generating a matching scheme for each joint point type includes:

obtaining a current match, traversing each endpoint in each cluster;

in response that the traversed endpoint is not used by the current match and the current match has no camera identification of the traversed endpoint, adding the traversed endpoint into the current match until each endpoint in the cluster is traversed, to obtain the joint point matching scheme of each joint point type;

wherein the merging joint point matching schemes of all joint point types to obtain the 2D personnel matching scheme includes:

counting the occurrence number of each match in the merging joint point matching schemes of all the joint point types, and combining a maximum occurrence number of a match to be the 2D personnel matching scheme.

It can be seen from the above description that although there is an error, the anti-projection rays of the same joint point from different cameras should also be close to each other, and if they exceed the preset distance threshold, they don't belong to the same joint point, which will not only affect the matching accuracy of joint points, but also reduce the calculation volume of the algorithm because of the reduced number of endpoints, to further improve the processing speed and work efficiency; and the endpoint clustering algorithm uses density clustering algorithm, the algorithm only requires for setting a domain radius parameter and needn't to pre-determine the number of clusters, a personnel matching scheme is generated through the clustering algorithm and the combination optimization algorithm, which can identify the maximum number of persons in the scene.

In an embodiment, the performing a three dimensional (3D) reconstruction for each person according to the 2D personnel matching scheme, to generate 3D information of each person for capturing 3D actions includes:

traversing each match in the 2D personnel matching scheme to obtain the 2D joint point coordinate and corresponding camera parameter in each joint point in each match;

calculating coordinates of multiple 2D joint points into three dimensional coordinates according to a multi-camera visual three dimensional measurement technology, to obtain 3D joint points;

calculating a reprojection errors according to the 3D joint points, and filtering 3D joint points with the reprojection error larger than a preset projection error;

traversing all the joint points in each match, and generating 3D information of a person according to all reserved 3D joint points;

traversing all matches, and getting 3D information of multiple persons corresponding to the number of matches.

It can be seen from the above description that when two persons are close to each other, one of the joint points easily belongs to two persons at the same time, so that such joint point is deleted to obtain the respective clusters of joint points of two persons to reduce the probability of false recognition and improve the accuracy of 3D reconstruction.

In an embodiment, the method further includes:

obtaining 3D information of the multiple persons from a current synchronous video frame and a next synchronous video frame;

determining whether an offset distance of a gravity position of each person in the current synchronous video frame from a gravity position of each person in the next synchronous video frame is less than a preset maximum movement distance threshold;

in response that the offset distance of the gravity position of each person in the current synchronous video frame from the gravity position of each person in the next synchronous video frame is less than the preset maximum movement distance threshold, updating position information corresponding to a person unique identification in a historical personal position set;

in response that offset distances of a gravity position of a certain person in the next synchronous video frame from gravity positions of all persons in the current synchronous video frame are larger than the preset maximum movement distance threshold, the certain person in the next synchronous video frame being a new person, giving the new person with a new person unique identification, and adding position information of the new person into the historical personal position set;

in response that offset distances of a gravity position of a certain person in the current synchronous video frame from gravity positions of all persons in the next synchronous video frame are larger than the preset maximum movement distance threshold, the certain person in the current synchronous video frame being a person-went away, and removing position information of a person unique identification of the person-went away from the historical personal position set.

It can be seen from the above description that the 3D position information of the person is tracked by the unique ID of the person and the offset distance of the gravity position of the person in the upper and lower frames.

Another embodiment of the present application provides a computer readable storage medium, on which a computer program is stored, the computer program when executed by a processor implements the above method for capturing three dimensional actions of multiple persons.

Figure 7:
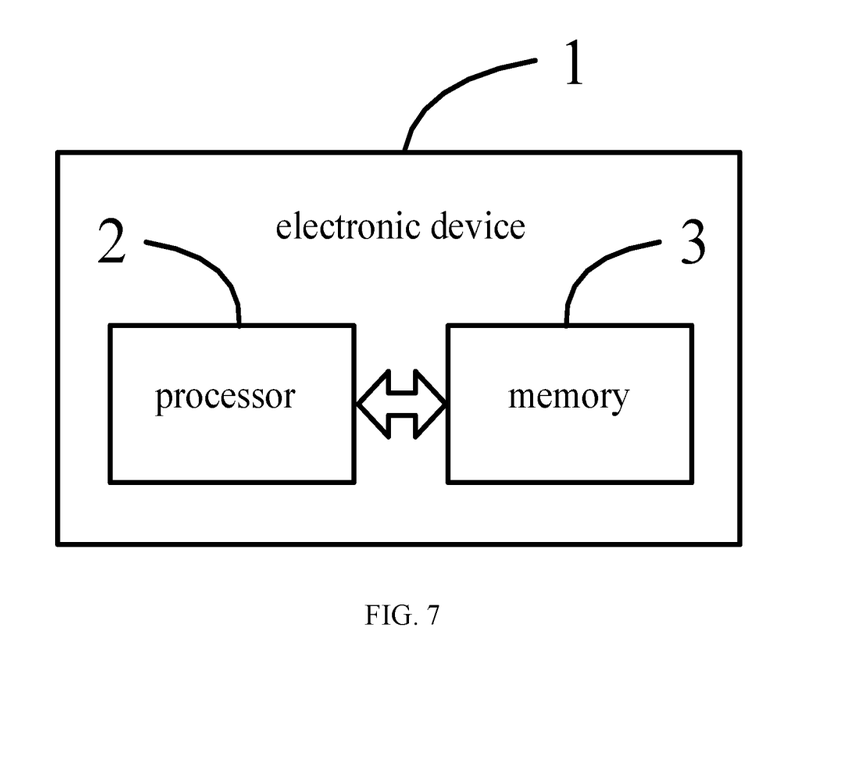
FIG. 7 is a schematic structural view of the electronic device according to some embodiments of the present application.

Referring to FIG. 7, an another embodiment of the present application provides an electronic device including a memory and a processor, a computer program runnable on the processor and stored on the memory, the processor when executing the computer program implements the above method for capturing three dimensional actions of multiple persons.

The specific implementation process and corresponding effect of the image scaling method included in the computer program in the above two embodiments can be referred to the relevant description in the method for capturing three dimensional actions of multiple persons in the previous embodiments.

Thus, multiple cameras are provided within a scene in the following embodiments to capture 3D actions of persons within the scene, such as capturing 3D actions of multiple persons capture in VR scenes, etc., the specific as follows.

Referring to FIGS. 1 to 5, an embodiment of the present application is provided as:

obtaining synchronous video frames of multiple cameras, recognizing and positioning joint points in each synchronous video frame of each camera, to obtain two dimensional (2D) joint point of each person in each camera.

In the embodiment, it is assumed that there are multiple cameras in the scene for capturing three dimensional actions, and the synchronous video frames of multiple cameras are obtained. Each video frame is an image of 3-channel BGR format. $A=\{n|1 \le n \le N\}$, A is a set of the cameras, n is the serial number of the cameras. In the embodiment, there are 12 cameras. In other equivalent embodiments, the number of cameras can be set according to actual needs.

In the embodiment, the OpenPose is used to detect and position the joint points of each person in all cameras to obtain the 2D joint points of each person in each camera. The number $K^n$ of 2D persons is recognized by each camera, k indicates person's number, with a range $1 \ldots K^n$. $X=\{Rnode_{nk}|n \in A, 1 \le k \le K^n\}$ indicates the 2D persons recognized by all cameras, $Rnode_{nk}$ indicates the recognized 2D persons. The reconstruction input parameter of each 3D person consists of a group of 2D persons, the cameras of which have no intersection. Because the persons who enters the scene are uncertain, multiple groups of 2D persons need to be matched.

In the 2D point matching algorithm, the confidences of the joint points are filtered by the threshold, to remove the mis-recognized joint points. In this way, the threshold for filtering can be changed by users, to solve the problem that the mis-recognition is caused by the interference of the field. The threshold of the confidence can be set flexibly according to the scene or actual application.

Calculating an anti-projection ray of each 2D joint point, and clustering coordinates of two endpoints of a shortest distance between two anti-projection rays to obtain a 2D personnel matching scheme, wherein the anti-projection ray is from a camera pointing to its corresponding 2D joint point.

In the embodiment, the anti-projection rays of the same joint point from the different cameras should overlap, but based on observation errors and 2D recognition errors, the anti-projection rays of the same joint point from different cameras may not overlap, but must be very close to each other. Therefore, coordinates of two endpoints of the shortest distance between the anti-projection rays are clustered, the matching relationship of the joint points in different cameras can be judged, to determine the correspondence of different persons in different cameras to obtain the 2D personnel matching scheme, so that different perspectives in the scene are recognized, and the shortest distance between the anti-projection rays are calculated and clustered through the principle that the anti-projection rays between the anti-projection rays of the same joint point from different cameras should overlap, to correctly match the multiple joint points of different cameras, to solve the problem that the 2D joint points are matched wrongly due to the obstruction existing in dense scenes and mis-recognition of 2D joint points, thus the actions of multiple persons are captured.

Performing a three dimensional (3D) reconstruction for each person according to the 2D personnel matching scheme, to generate 3D information of each person for capturing 3D actions.

Referring to FIGS. 1 to 5, the operation S2 includes:

classifying all 2D joint points according to joint point types to obtain all 2D joint points corresponding to each joint point type.

Figure 5:
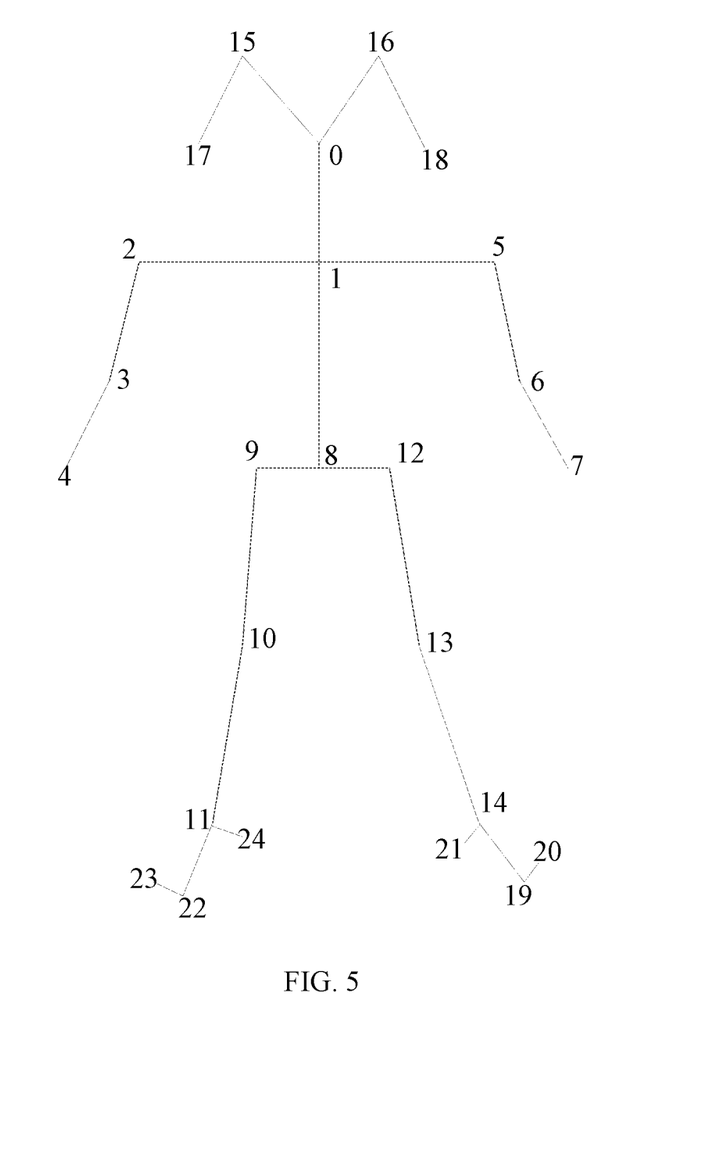
FIG. 5 is a flowchart of OpenPose 25 types of joint points according to some embodiments of the present application.

As shown in FIG. 5, for the OpenPose, the recognized 2D joint points consist of 25 types. Therefore, there are 25 types of joint points in the embodiment. In other embodiments, an appropriate selection of joint points according to actual needs also belongs to an equivalent embodiment of the present application.

Calculating the anti-projection ray of each 2D joint point of each joint point type, clustering according to the shortest distance between two anti-projection rays, to obtain a joint point matching scheme of each joint point type.

In the embodiment, only the joint points of the same joint point type are matched and calculated in the 2D joint points of the 25 types respectively, to reduce the number of matching operations and increase the processing speed, especially when the number of persons is large, the processing speed can be significantly increased.

Merging joint point matching schemes of all joint point types to obtain the 2D personnel matching scheme.

The joint point matching scheme of 25 types is combined to obtain the 2D personnel matching scheme, which includes several matches, the number of matches is the same as the number of persons entering the scene.

Figure 1:
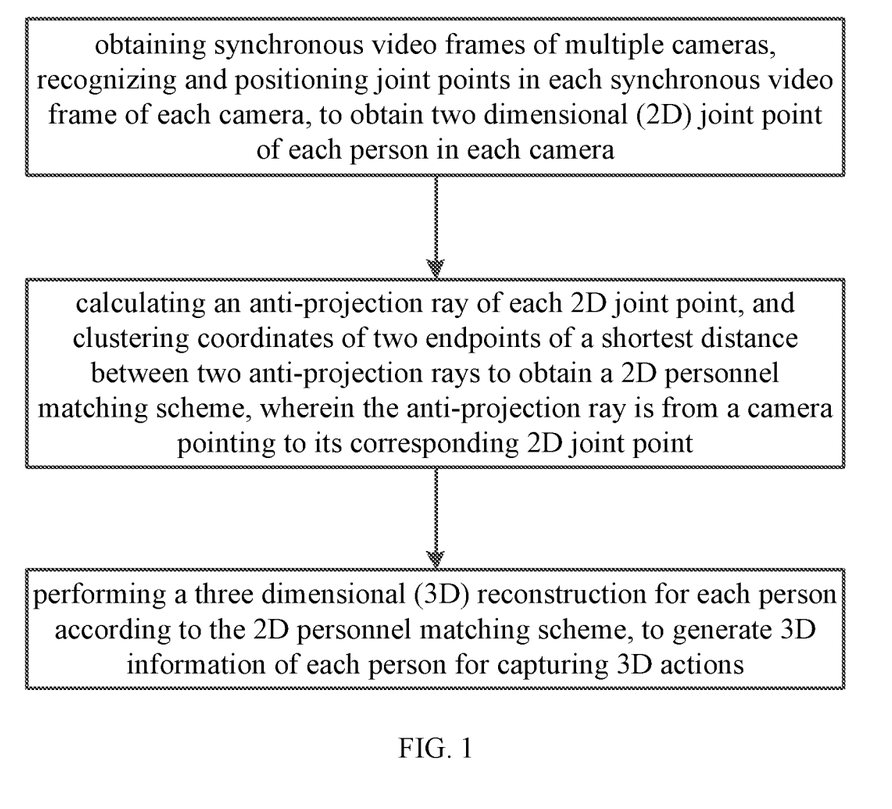
FIG. 1 is a flowchart of a method for capturing three dimensional actions of multiple persons according to some embodiments of the present application.
Figure 2:
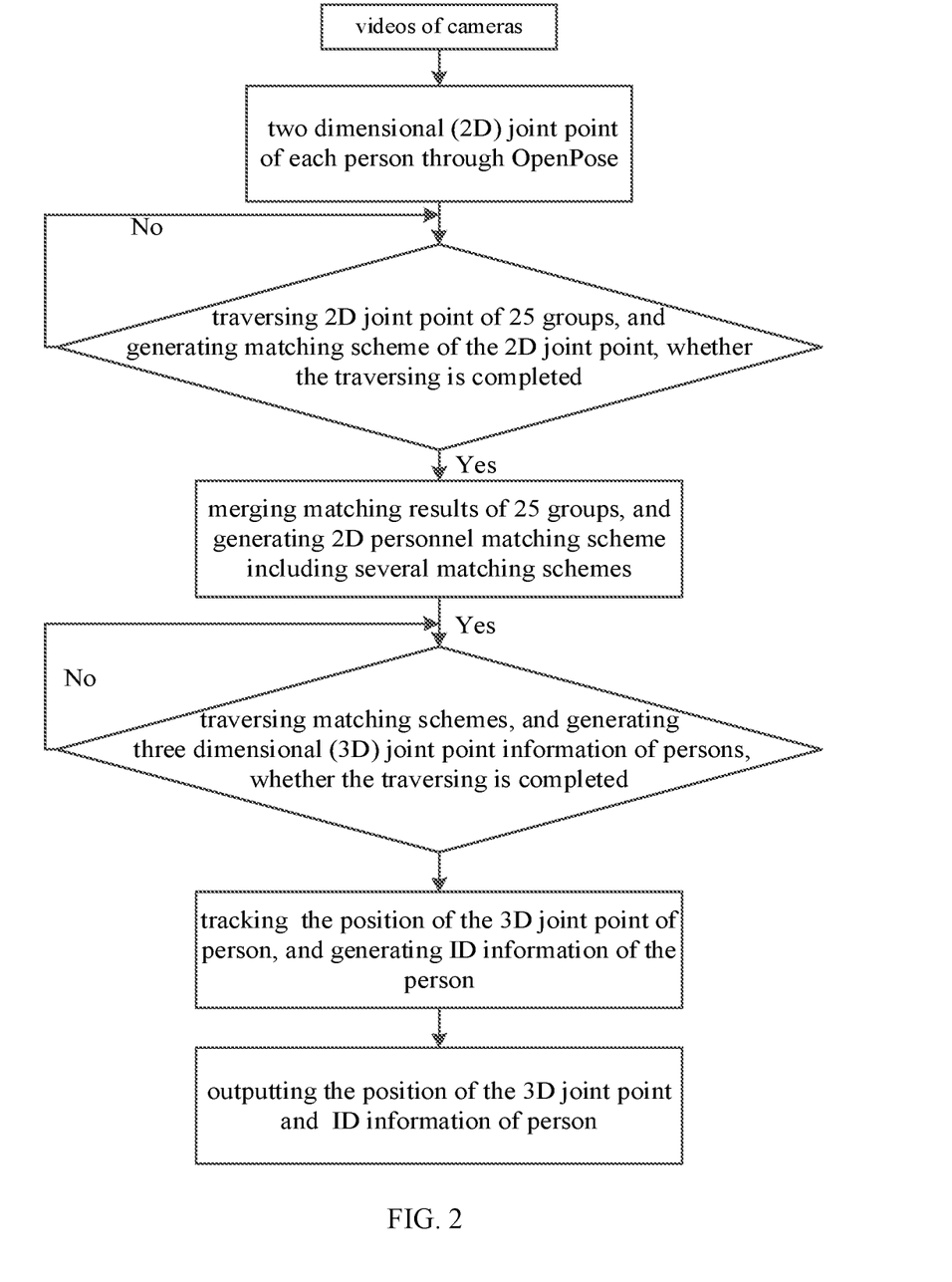
FIG. 2 is an overall flowchart of the method for capturing three dimensional actions of multiple persons according to some embodiments of the present application.
Figure 3:
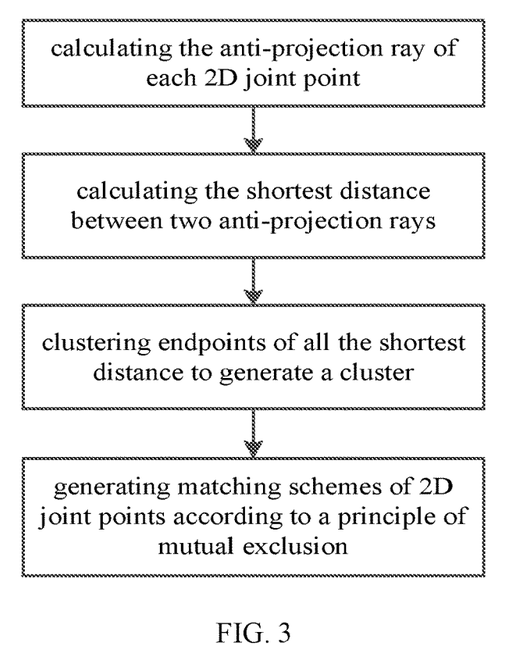
FIG. 3 is a flowchart of a matching of 2D joint points according to some embodiments of the present application.

Referring to FIGS. 1 to 5, as shown in FIG. 3, the calculating the anti-projection ray of each 2D joint point of each joint point type, clustering according to the shortest distance between two anti-projection rays, to obtain a joint point matching scheme of each joint point type includes:

for each 2D joint point, obtaining a 3D coordinate of the camera according to an origin of coordinates and corresponding extrinsic parameters, taking the 3D coordinate of the camera as an endpoint of the anti-projection ray.

In the embodiment, the anti-projection ray of the 2D joint point $uv_{nk}$ is calculated, $uv_{nk} \in Rnode_{nk}$.

The anti-projection ray consists of a direction vector from the 3D coordinate of the camera to the 2D joint point $uv_{nk}$.

The 3D coordinates $P_n$ of the camera can be obtained by multiplying extrinsic parameters by the origin of the coordinates, with the formula $P_n=extrinsic_n*0$, $extrinsic_n$ is the extrinsic parameter and 0 is the coordinate origin (0,0,0).

The direction vector can be obtained by the calculation of the coordinate of the 2D joint point, corresponding intrinsic parameters and extrinsic parameters, with the formula $\vec{d}_{nk}=intrinsic_n*extrinsic_n*uv_{nk}$, $intrinsic_n$ is the extrinsic parameter.

Obtaining a direction vector of the anti-projection ray according to the corresponding intrinsic parameters, extrinsic parameters and a coordinate of each 2D joint point, to obtain the anti-projection ray of each 2D joint point.

In the embodiment, according to the basic principles of vision of multiple cameras, a 3D joint point of a certain person observed by multiple cameras, its anti-projection rays must be intersecting to the joint point, but based on observation errors and 2D recognition errors, anti-projection rays of the same joint point from different cameras may not overlap, but they must be very close. Thus, a large number of endpoints should be gathered near the 3D joint points in 3D space.

Figure 6:
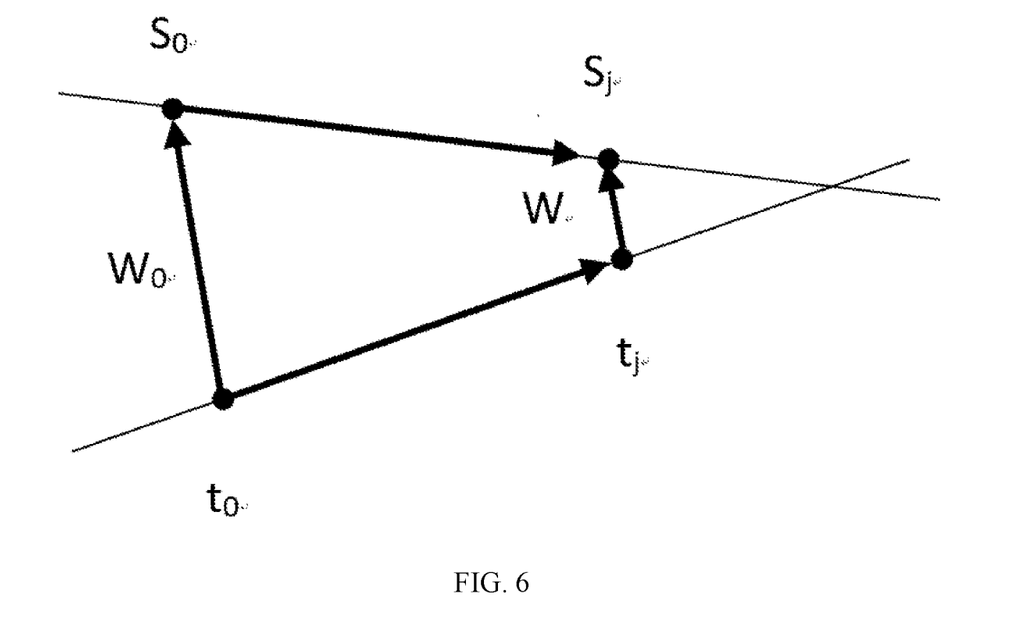
FIG. 6 is a matching diagram of the method for capturing three dimensional actions of multiple persons in the multi-person scene according to some embodiments of the present application.

In the embodiment, as shown in FIG. 6, it should be known that a distance between two anti-projection rays is a distance between two anti-projection rays in the spaces. In FIG. 6, there seems to be intersecting points, but the two anti-projection rays are impossible to intersect in the three dimensional space. Thus, FIG. 6 is only used for illustration when calculating. Thus, obtaining of the coordinates of two endpoints of the shortest distance between the two anti-projection rays includes the following steps:

an anti-projection ray $\overline{line_s}$ having a starting point coordinate $s_0$ and a direction vector $\vec{d}_s$, an anti-projection ray $\overline{line_t}$ having a starting point coordinate $t_0$ and a direction vector $\vec{d}_t$, a vector of the anti-projection ray $\overline{line_s}$ is $line_s = s_0 + \vec{d}_s$, a vector of the anti-projection ray $\overline{line_t}$ is $line_t = t_0 + \vec{d}_t$;

vectors of coordinates $s_j$, $t_j$ of the two endpoints of the shortest distance between the anti-projection ray $\overline{line_s}$ and the anti-projection ray $\overline{line_t}$ being $s_j = s_0 + s_c \cdot \vec{d}_s$, $t_j = t_0 + t_c \cdot \vec{d}_t$; a vector of the shortest distance between the anti-projection ray $\overline{line_s}$ and the anti-projection ray $\overline{line_t}$ being a first formula $\vec{w} = \vec{w}_0 + s_c \cdot \vec{d}_s - t_c \cdot \vec{d}_t$, wherein $s_c$ and $t_c$ are scalar;

substituting the first formula into $\vec{d}_s \cdot \vec{w} = 0$ and $\vec{d}_t \cdot \vec{w} =$, to obtain a second formula $(\vec{d}_s \cdot \vec{d}_s)s_c - (\vec{d}_s \cdot \vec{d}_t)t_c = \vec{d}_s \cdot \vec{w}_0$ and a third formula $(\vec{d}_s \cdot \vec{d}_t)s_c - (\vec{d}_t \cdot \vec{d}_t)t_c = -\vec{d}_t \cdot \vec{w}_0$, to obtain the scalar sc=(be-cd)/(ac-b2) and the scalar tc=(ae-bd)/(ac-b2); wherein $a = (\vec{d}_s \cdot \vec{d}_s)$, $b = (\vec{d}_s \cdot \vec{d}_t)$, $c = (\vec{d}_t \cdot \vec{d}_t)$, $d = \vec{d}_s \cdot \vec{w}_0$, $e = \vec{d}_t \cdot \vec{w}_0$;

determining whether $ac-b^2$ is equal to 0; in response that $ac-b^2$ is equal to 0, the anti-projection ray $\overline{line_s}$ being parallel to the anti-projection ray $\overline{line_t}$, and specifying a fixed point on one of the two anti-projection rays as one of the two endpoints to be substituted into the second formula and the third formula, to obtain the coordinates $s_j$, $t_j$ the two endpoints; in response that $ac-b^2$ is not equal to 0, obtaining the coordinates $s_j$, $t_j$ of the two endpoints according to the scalar $s_c = (be-cd)/(ac-b^2)$ and the scalar $t_c = (ae-bd)/(ac-b^2)$.

When the $ac-b^2$ is equal to 0, the anti-projection ray $\overline{line_s}$ and the anti-projection ray $\overline{line_t}$ are parallel. The distance between the two anti-projection rays is the constant. Therefore, the calculated distance by selecting any endpoint is the same.

Clustering all the endpoints of each joint point type, and outputting a clustering result; and generating the joint point matching scheme of each joint point type according to the clustering result.

In the embodiment, the clustering all the endpoints of each joint point type, and outputting a clustering result; and generating the joint point matching scheme of each joint point type according to the clustering result includes:

obtaining the shortest distance $d_{min} = |s_j - t_j|$ according to the coordinates $s_j$, $t_j$ of the two endpoints, when the coordinates of the two endpoints of the shortest distance between any two of the anti-projection rays are obtained;

deleting shortest distances $d_{min}$ of each joint point type larger than a preset distance threshold, and forming an endpoint set R with endpoints corresponding to remaining shortest distances of each joint point type, wherein each endpoint corresponds to a 2D joint point, a camera identification and a person identification;

performing a neighboring matching on all the endpoints in the endpoint set R of each joint point type through a K's neighboring classification algorithm, to obtain a cluster formed by neighboring endpoints, and ranking the cluster from high to low according to the number of the endpoints in the cluster to obtain ranked cluster.

In the embodiment, a cluster will be carried out according to the denseness of the space. The only parameter entered by the user is the neighbor ε(Eps). The method is implemented as follows:

the distance between the endpoints through k-Nearest-Neighbor (KNN), assuming that there are at most two endpoints in the neighborhood, then the value knn can be set as: $knn = max(C_A^2 * 3/2, R)$.

After the search is completed, the result set is traversed. The neighboring distance in the searched result is filtered by ε(Eps) to generate a neighborhood matching relationship for each endpoint.

After that, the neighborhood matching relationship of the endpoints is ranked.

The unprocessed endpoints are removed in turn, and clusters are sorted by density, and adjacent endpoints form a density class of clusters until all neighboring matching relationships are processed completely. Finally, the cluster is ranked from high to low according the density, and the cluster information is output. The effect is shown in FIG. 6.

Generating a matching scheme for each joint point type includes: obtaining a current match, traversing each endpoint in each cluster; in response that the traversed endpoint is not used by the current match and the current match has no camera identification of the traversed endpoint, adding the traversed endpoint into the current match until each endpoint in the cluster is traversed, to obtain the joint point matching scheme of each joint point type.

In the embodiment, each endpoint in the cluster can correspond to a 2D joint point nk and a 2D person $Rnode_{nk}$. When the algorithm begins to run, the $Rnode_{available}$ indicates a set of unused 2D joint points, the current match is indicated by $m_{current}$, with $Rnode_{available} = X$, $m_{current} = \phi$; each endpoint $Rnode_{nk}$ is traversed. According to the principle of mutual exclusion of cameras, if the endpoint is not used, and the current match does not have endpoints of the same camera, then $m_{current} += Rnode$, $Rnode_{available} -= Rnode$ is obtained; all endpoints in the cluster are traversed, until all the endpoints are processed to exit, then the match is generated.

All clusters are processed in turn or when Rnode$_{available}$=ϕ, a plurality of matches are generated by the algorithm, to generate the matching scheme.

In the embodiment, the matching scheme for joint points of the left hands of five persons.

The merging joint point matching schemes of all joint point types to obtain the 2D personnel matching scheme includes:
  counting the occurrence number of each match in the merging joint point matching schemes of all the joint point types, and combining a maximum occurrence number of a match to be the 2D personnel matching scheme.

In the embodiment, 25 groups of joint point matching schemes need to be merged, the method is counting all the matches in the 25 groups of matching schemes and all the matches are ranked according to the occurrence number of the matches; when the algorithm starts running, the matching scheme is empty M=ϕ; after that, the matches m are traversed in turn, and if there is no conflict m with the matching scheme, the match is added to the scheme, with the formula as follow:

$$\text{Conflict }(m) = \begin{cases} 1 & m \cap \forall m' \neq \Phi, \forall m' \in M \\ 0 & m \cap \forall m' = \Phi, \forall m' \in M \end{cases}, \text{Conflict}(m, M)$$

Figure 4:
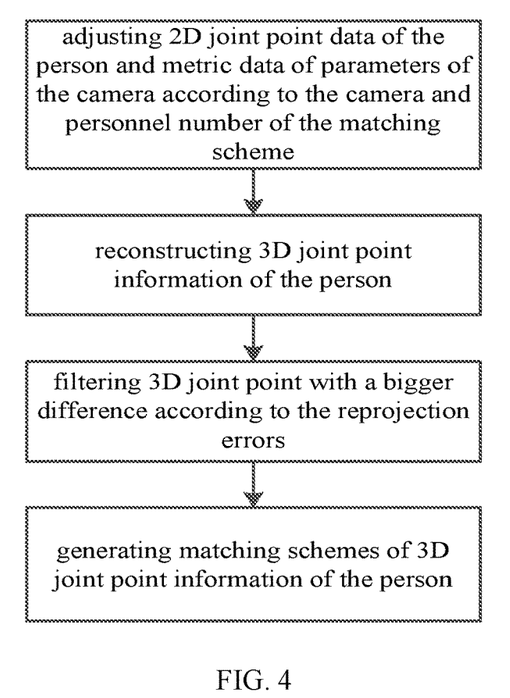
FIG. 4 is a flowchart of a reconstruction of 3D joint points of the persons according to some embodiments of the present application.

As shown in FIG. 4, the performing a three dimensional (3D) reconstruction for each person according to the 2D personnel matching scheme, to generate 3D information of each person for capturing 3D actions includes:
  traversing each match in the 2D personnel matching scheme to obtain the 2D joint point coordinate and corresponding camera parameter in each joint point in each match;
  calculating coordinates of multiple 2D joint points into three dimensional coordinates according to a multiple camera visual three dimensional measurement technology, to obtain 3D joint points;
  calculating a reprojection errors according to the 3D joint points, and filtering 3D joint points with the reprojection error larger than a preset projection error;
  traversing all the joint points in each match, and generating 3D information of a person according to all reserved 3D joint points;
  traversing all matches, and getting 3D information of multiple persons corresponding to the number of matches.

Four cameras and two bowling balls are used to demonstrate the process of 3D reconstruction, the cameras are numbered with numbers [0-3] sequentially from left to right and 2D points of the bowling balls in the screen are numbered as: [0-0], [0-1], [1-0], [1-1], [2-0], [2-1], [3-0] and [3-1]. The correct 2D matching scheme for 3D reconstruction of the bowling balls should be: {0-1, 1-0, 2-0, 3-0}, {0-0, 1-1, 2-1, 3-1}.

Due to four cameras and two bowling balls, thus there are 2D points of eight bowling balls, each point corresponds to an anti-projection ray, the shortest distances between each straight line and different cameras are calculated. 24 shortest distances are obtained, there are 48 endpoints. The density clustering algorithm will be the radius of 0.2 meters, then 13 results can be clustered, the number of endpoints of two results are 12 as shown in the circle, the 12 points are just the endpoints of the shortest distances among the 4 straight lines, then the 2D point matching schemes are generated according to the proximity point clustering results.

Group 0 clustering result: {0-1, 1-0, 2-0, 3-0}
Group 1 clustering result: {0-0, 1-1, 2-1, 3-1}.

The above 2D point matching scheme is consistent with the expectation, thus the accurate recognition of 2D points of the bowling balls are achieved.

In the actual application scenario, the embodiment takes four cameras plus two persons as an example, where the four cameras are numbered as 0, 1, 2 and 3 from left to right, and the two persons are numbered as 0 and 1, then the final matching scheme should be: {0-0, 1-0, 2-1, 3-0}, {0-1, 1-1, 2-0, 3-1}.

25 groups of matching schemes are finally obtained as shown in Table 1 through the identification of joint points and the calculation of matching relations.

TABLE 1

| | 25 groups of matching schemes |
|---|---|
| Joint point | 2D matching scheme |
| 0 | {0-1, 1-1, 2-0, 3-1}, {0-0, 1-0, 2-1, 3-0} |
| 1 | {0-1, 1-1, 2-0, 3-1}, {0-0, 1-0, 2-1, 3-0} |
| 2 | {0-1, 1-1, 2-0, 3-1}, {0-0, 1-0, 2-1, 3-0} |
| 3 | {0-1, 1-1, 2-0, 3-1}, {0-0, 1-0, 2-1, 3-0} |
| 4 | {0-1, 1-1, 2-0, 3-1}, {0-0, 1-0, 2-1, 3-0} |
| 5 | {0-1, 1-1, 2-0, 3-1}, {0-0, 1-0, 2-1, 3-0} |
| 6 | {0-1, 1-1, 2-0, 3-1}, {0-0, 1-0, 2-1, 3-0} |
| 7 | {0-1, 1-1, 2-0, 3-1}, {0-0, 1-0, 2-1, 3-0} |
| 8 | {0-1, 1-1, 2-0, 3-1}, {0-0, 1-0, 2-1, 3-0} |
| 9 | {0-1, 1-1, 2-0, 3-1}, {0-0, 1-0, 2-1, 3-0} |
| 10 | {0-1, 1-1, 2-0, 3-1}, {0-0, 1-0, 2-1, 3-0} |
| 11 | {0-1, 1-1, 2-0, 3-1}, {0-0, 1-0, 2-1, 3-0} |
| 12 | {0-1, 1-1, 2-0, 3-1}, {0-0, 1-0, 2-1, 3-0} |
| 13 | {0-1, 1-1, 2-0, 3-1}, {0-0, 1-0, 2-1, 3-0} |
| 14 | {0-1, 1-1, 2-0, 3-1}, {0-0, 1-0, 2-1, 3-0} |
| 15 | {0-1, 1-1, 2-0, 3-1}, {0-0, 1-0, 2-1, 3-0} |
| 16 | {0-1, 1-1, 2-0, 3-1}, {0-0, 1-0, 2-1, 3-0} |
| 17 | {0-0, 2-1, 3-0}, {0-1, 2-0} |
| 18 | {0-0, 1-0, 3-0}, {1-1, 3-1} |
| 19 | {0-0, 1-0, 2-1, 3-0}, {0-1, 1-1, 2-0, 3-1} |
| 20 | {0-0, 1-0, 2-1, 3-0}, {0-1, 1-1, 2-0, 3-1} |
| 21 | {0-1, 1-1, 2-0, 3-1}, {0-0, 1-0, 2-1, 3-0} |
| 22 | {0-0, 1-0, 3-0}, {1-1, 3-1} |
| 23 | {0-0, 1-0, 3-0}, {1-1, 3-1} |
| 24 | {0-0, 1-0, 2-1, 3-0}, {1-1, 2-0, 3-1} |

According to the above analysis {0-1, 1-1, 2-0, 3-1}, {0-0, 1-0, 2-1, 3-0} is the matching schemes for most joint points, which is up to 21 times, and the matching schemes of other joint points belong to the subset of this scheme, so the personnel matching schemes selecting {0-1, 1-1, 2-0, 3-1}, {0-0, 1-0, 2-1, 3-0} are consistent with the expected scheme.

Referring to FIGS. 1 to 5, the embodiments of the present application also include:
  obtaining 3D information of the multiple persons from a current synchronous video frame and a next synchronous video frame; determining whether an offset distance of a gravity position of each person in the current synchronous video frame from a gravity position of each person in the next synchronous video frame is less than a preset maximum movement distance threshold; in response that the offset distance of the gravity position of each person in the current synchronous video frame from the gravity position of each person in the next synchronous video frame is less than the preset maximum movement distance threshold, updating position information corresponding to a person unique identification in a historical personal position set;

in response that offset distances of a gravity position of a certain person in the next synchronous video frame from gravity positions of all person in the current synchronous video frame are larger than the preset maximum movement distance threshold, the certain person in the next synchronous video frame being a new person, giving the new person with a new person unique identification, and adding position information of the new person into the historical personal position set;

in response that offset distances of a gravity position of a certain person in the current synchronous video frame from gravity positions of all person in the next synchronous video frame are larger than the preset maximum movement distance threshold, the certain person in the current synchronous video frame being a person-went away, and removing position information of a person unique identification of the person-went away from the historical personal position set.

In the embodiment, assuming that the historical personal position set is LC, the initial run LC=ϕ; 3D information P of a group of persons is recognized in the next frame, the gravity position information C={c'} of the group of persons is calculated, is a gravity position of a person, with a formula $$c_n = \frac{1}{25}\sum \forall j, \forall i, \in p_n;$$

distances among gravity positions of persons in LC and C through a neighboring search algorithm, with a formula d(c,c')=|c−c'|, c∈C, c'∈LC, with c indicates the gravity position of the person in C, c' is the gravity position of the person in the historical persons LC; the maximum movement distance of the person is $D_{max}$, if there is d(c,c')≤$D_{max}$, that means, a change in distance of the gravity position of the person is less than the threshold, the person c and the person c' are considered to be the same person, the gravity position of the person C is updated. For d(c,∀c')>$D_{max}$, c∈C, ∀c'∈LC, the distance between the person c and any one of persons in the LC is greater than the threshold, the person c is a new person, an ID is generated for the new person, the new person is added in the LC; for d(∀c,c')>$D_{max}$, ∀c∈C, c'∈LC, the distances between the person c' and any one of person in C are greater than the threshold, C is considered to a person-went away, the person-went away is removed from the LC.

Another embodiment of the present application provides a computer readable storage medium, on which a computer program is stored, the computer program when executed by a processor implements the method for capturing three dimensional actions of multiple persons according to any of above embodiments.

Referring to FIG. 7, embodiment of the present application provides an electronic device 1, which includes a memory 3, a processor 2 and a computer program stored on the memory 3 and runnable on the processor 2, the processor 2 when executing the computer program implements the method for capturing three dimensional actions of multiple persons according to any of above embodiments.

In summary, the method for capturing three dimensional actions of multiple persons, storage medium and electronic device provided by the present application can detect human postures, without the help of any wearable device, through OpenPose pose detection using deep convolutional network. Multiple cameras are used to collect and identify different perspectives in the scene, and calculate and cluster the short distance between two anti-projection rays according to an overlapping principle of two anti-projection rays of the same joint point through different cameras, to correctly match multiple joint points of different cameras, to solve a problem that the 2D joint points are matched wrongly due to the obstruction existing in dense scenes and mis-recognition of 2D joint points, thus the actions of multiple persons are captured, and multiple joint points are classified according to joint point types, and filtered by a preset distance threshold and filtered by a confidence, and the endpoint clustering algorithm are using density clustering algorithm and the obscured joint points are deleted, etc., to further limit, the processing speed and work efficiency can be improved and the accuracy of recognition can be ensured.

The above mentioned is only an embodiment of the present application, not to limit the scope of the present application, and all equivalent transformations made by using the specification and the drawings of the present application, or direct or indirect application in the related technical field, are included in the scope of the present application.

What is claimed is:

1. A method for capturing three dimensional actions of multiple persons, comprising:
    obtaining synchronous video frames of multiple cameras, recognizing and positioning joint points in each synchronous video frame of each camera, to obtain two dimensional (2D) joint point of each person in each camera;
    calculating an anti-projection ray of each 2D joint point, and clustering coordinates of two endpoints of a shortest distance between two anti-projection rays to obtain a 2D personnel matching scheme, wherein the anti-projection ray is from a camera pointing to its corresponding 2D joint point;
    performing a three dimensional (3D) reconstruction for each person according to the 2D personnel matching scheme, to generate 3D information of each person for capturing 3D actions;
    obtaining 3D information of the multiple persons from a current synchronous video frame and a next synchronous video frame;
    determining whether an offset distance of a gravity position of each person in the current synchronous video frame from a gravity position of each person in the next synchronous video frame is less than a preset maximum movement distance threshold;
    in response that the offset distance of the gravity position of each person in the current synchronous video frame from the gravity position of each person in the next synchronous video frame is less than the preset maximum movement distance threshold, updating position information corresponding to a person unique identification in a historical personal position set;
    in response that offset distances of a gravity position of a certain person in the next synchronous video frame from gravity positions of all persons in the current synchronous video frame are larger than the preset maximum movement distance threshold, the certain person in the next synchronous video frame being a new person, giving the new person with a new person unique identification, and adding position information of the new person into the historical personal position set; and
    in response that offset distances of a gravity position of a certain person in the current synchronous video frame from gravity positions of all persons in the next synchronous video frame are larger than the preset maximum movement distance threshold, the certain person in the current synchronous video frame being a person-went away, and removing position information of a person unique identification of the person-went away from the historical personal position set.

2. The method according to claim 1, wherein the calculating an anti-projection ray of each 2D joint point, and clustering coordinates of two endpoints of the shortest distance between two anti-projection rays to obtain the 2D personnel matching scheme comprises:
   classifying all 2D joint points according to joint point types to obtain all 2D joint points corresponding to each joint point type;
   calculating the anti-projection ray of each 2D joint point of each joint point type, clustering coordinates of two endpoints of the shortest distance between two anti-projection rays, to obtain a joint point matching scheme of each joint point type; and
   merging joint point matching schemes of all joint point types to obtain the 2D personnel matching scheme.

3. The method according to claim 2, wherein the clustering coordinates of two endpoints of the shortest distance between two anti-projection rays to obtain the 2D personnel matching scheme comprises:
   calculating the shortest distance between the anti-projection ray of each 2D joint point in each camera and the anti-projection ray of each 2D joint point in each other cameras of a same joint point type, and obtaining the coordinates of two endpoints of the shortest distance between the anti-projection rays; and
   clustering all the endpoints of each joint point type to output a clustering result; and
   generating the joint point matching scheme of each joint point type according to the clustering result.

4. The method according to claim 3, wherein the obtaining the coordinates of two endpoints of the shortest distance between the anti-projection rays comprises:
   an anti-projection ray $\overline{line}_s$ having a starting point coordinate $s_0$ and a direction vector $\vec{d}_s$, an anti-projection ray $\overline{line}_t$ having a starting point coordinate $t_0$ and a direction vector $\vec{d}_t$,
   a vector of the anti-projection ray $\overline{line}_s$ is $\overline{line}_s = s_0 + \vec{d}_s$;
   a vector of the anti-projection ray $\overline{line}_t$ is $line_t = t_0 + \vec{d}_t$;
   vectors of coordinates $s_j$, $t_j$ of the two endpoints of the shortest distance between the anti-projection ray $\overline{line}_s$ and the anti-projection ray $\overline{line}_t$ being $s_j = s_0 + s_c \cdot \vec{d}_s$, $t_j = t_0 + t_c \cdot \vec{d}_t$;
   a vector of the shortest distance between the anti-projection ray $\overline{line}_s$ and the anti-projection ray $\overline{line}_t$ being a first formula $\vec{w} = \vec{w}_0 + s_c \cdot \vec{d}_s - t_c \cdot \vec{d}_t$, wherein $s_c$ and $t_c$ are scalar;
   substituting the first formula into $\vec{d}_s \cdot \vec{w} = 0$ and $\vec{d}_t \cdot \vec{w} = 0$, to obtain a second formula $(\vec{d}_s \cdot \vec{d}_s) s_c - (\vec{d}_s \cdot \vec{d}_t) t_c = -\vec{d}_s \vec{w}_0$ and a third formula $(\vec{d}_s \cdot \vec{d}_t) s_c - (\vec{d}_t \cdot \vec{d}_t) t_c = -\vec{d}_t \vec{w}_0$, to obtain the scalar $s_c = (be-cd)/(ac-b^2)$ and the scalar $t_c = (ae-bd)/(ac-b^2)$;
   wherein $a = (\vec{d}_s \cdot \vec{d}_s)$, $b = (\vec{d}_s \cdot \vec{d}_t)$, $c = (\vec{d}_t \cdot \vec{d}_t)$, $d = \vec{d}_s \cdot \vec{w}_0$, $e = \vec{d}_t \cdot \vec{w}_0$;
   determining whether $ac-b^2$ is equal to 0;
   in response that $ac-b^2$ is equal to 0, the anti-projection ray $\overline{line}_s$ being parallel to the anti-projection ray $\overline{line}_t$, and specifying a fixed point on one of the two anti-projection rays as one of the two endpoints to be substituted into the second formula and the third formula, to obtain coordinates $s_j$, $t_j$ of the two endpoints;
   in response that $ac-b^2$ is not equal to 0, obtaining the coordinates $s_j$, $t_j$ of the two endpoints according to the scalar $s_c = (be-cd)/(ac-b^2)$ and the scalar $t_c = (ae-bd)/(ac-b^2)$.

5. The method according to claim 3, wherein the clustering all the endpoints of each joint point type to output a clustering result, and generating the joint point matching scheme of each joint point type according to the clustering result comprises:
   obtaining the shortest distance $d_{min} = |s_j - t_j|$ according to the coordinates $s_j$, $t_j$ of the two endpoints, when the coordinates of the two endpoints of the shortest distance between any two of the anti-projection rays are obtained;
   deleting shortest distances $d_{min}$ in each joint point type larger than a preset distance threshold, and forming an endpoint set R with endpoints corresponding to remaining shortest distances in each joint point type, wherein each endpoint corresponds to a 2D joint point, a camera identification and a person identification;
   performing a neighboring matching on all the endpoints in the endpoint set R of each joint point type through a K's neighboring classification algorithm, to obtain a cluster formed by neighboring endpoints, and ranking the cluster from high to low according to the number of the endpoints in the cluster to obtain ranked cluster;
   wherein generating a matching scheme for each joint point type comprises:
   obtaining a current match, traversing each endpoint in each cluster;
   in response that the traversed endpoint is not used by the current match and the current match has no camera identification of the traversed endpoint, adding the traversed endpoint into the current match until each endpoint in the cluster is traversed, to obtain the joint point matching scheme of each joint point type;
   wherein the merging joint point matching schemes of all joint point types to obtain the 2D personnel matching scheme comprises:
   counting the occurrence number of each match in the merging joint point matching schemes of all the joint point types, and combining a maximum occurrence number of a match to be the 2D personnel matching scheme.

6. The method according to claim 3, wherein the performing the 3D reconstruction for each person according to the 2D personnel matching scheme, to generate 3D information of each person for capturing 3D actions comprises:
   traversing each match in the 2D personnel matching scheme to obtain the 2D joint point coordinate and corresponding camera parameter in each joint point in each match;
   calculating coordinates of multiple 2D joint points into three dimensional coordinates according to a multi-camera visual three dimensional measurement technology, to obtain 3D joint points; calculating reprojection errors according to the 3D joint points, and filtering 3D joint points with the reprojection error larger than a preset projection error;

traversing all the joint points in each match, and generating 3D information of a person according to all reserved 3D joint points; and traversing all matches, and getting 3D information of multiple persons corresponding to the number of matches.

7. The method according to claim 1, wherein the calculating the anti-projection ray of each 2D joint point comprises:

for each 2D joint point, obtaining a 3D coordinate of the camera according to an origin of coordinates and corresponding extrinsic parameters, and taking the 3D coordinate of the camera as an endpoint of the anti-projection ray; and obtaining a direction vector of the anti-projection ray according to the corresponding intrinsic parameters, extrinsic parameters and a coordinate of each 2D joint point, to obtain the anti-projection ray of each 2D joint point.

8. A non-transitory computer readable storage medium, wherein a computer program is stored on the non-transitory computer readable storage medium, when the computer program is executed by a processor, the method for capturing three dimensional actions of multiple persons according to claim 1 is implemented.

9. An electronic device, comprising a memory and a processor, a computer program runnable on the processor and stored on the memory, wherein when the computer program is executed by a processor, the method for capturing three dimensional actions of multiple persons according to claim 1 is implemented.

* * * * *